Nov. 17, 1936.   H. T. WHEELER   2,061,392
PACKING GASKET
Filed May 29, 1933
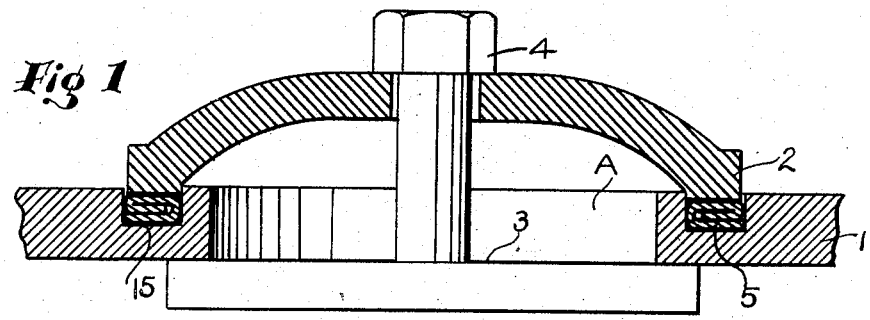
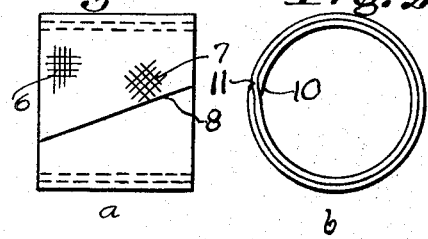
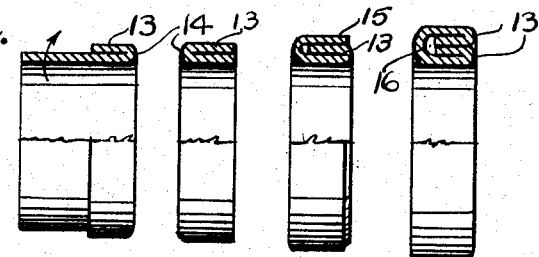
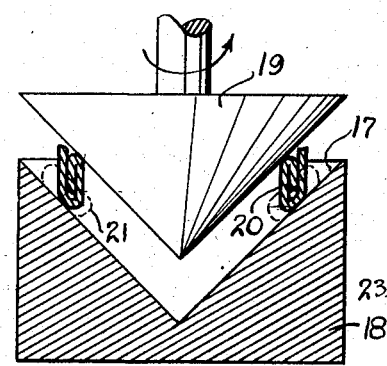
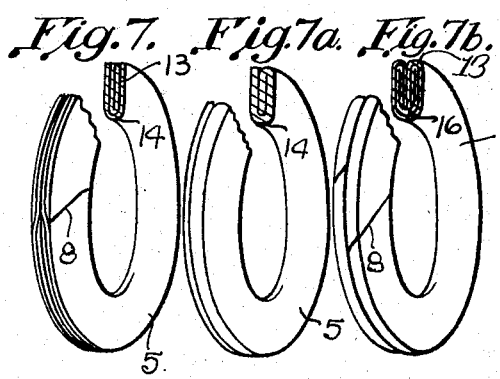
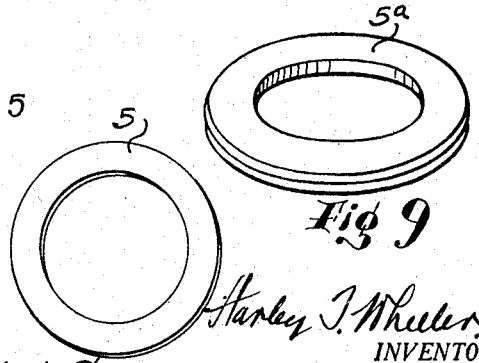
Harley T. Wheeler
INVENTOR.
BY Jesse R. Stone
& Lester B. Clark
ATTORNEYS.

Patented Nov. 17, 1936

2,061,392

UNITED STATES PATENT OFFICE 2,061,392

PACKING GASKET

Harley T. Wheeler, Dallas, Tex.

Application May 29, 1933, Serial No. 673,419

7 Claims. (Cl. 154—2)

My invention relates to a ring of packing material particularly adapted for use as a gasket although broadly it is adaptable for use in other situations.

In the production of the ordinary gasket employed between joints where the leakage of pressure fluid is to be prevented, the ordinary packing gasket is subject to several objections, particularly where the gaskets are formed of absorbent flexible material. The ring commonly employed is made up of a strip of the desired fabric which is formed into a ringshape and the meeting ends of the strip are overlapped and secured together by sewing or adhesives or otherwise, making a thickened portion where the overlapping of the ends occurs. This makes the gasket subject to leakage and is a very common source of trouble.

It is an object of my invention to provide a packing ring or gasket which is flattened into a plane at right angles to the axis of the ring and in which there are no overlapping ends but a continuous ring of fabric without joints.

I desire to form the gasket of tubular material folded on itself in such way as to particularly guard against leakage therethrough.

It is a further object of the invention to provide a ring of this character in which the density thereof is greatest adjacent the inner surface, thus adapting the ring to prevent seepage of the pressure fluid and enabling the gasket to withstand higher pressures.

The invention lies particularly in the method by which the rings are formed from a tubular member into a finished ring of the form desired whereby I am enabled to produce a lapless, jointless, and seamless packing ring.

This application shows a modification of the invention disclosed in my previous application Serial No. 606,115, filed April 19, 1932.

In the drawing herewith I have illustrated the construction of my ring and the manner in which the same may be formed. In Fig. 1 is shown one embodiment of my packing gasket shown in position about a manhole.

Fig. 2 is a side elevation of a tubular section of woven material.

Fig. 2a is an end elevation thereof.

Figs. 2b to 2e, inclusive are side views partly in section and partly in elevation illustrating separate stages in the folding of a tubular member in the construction of a packing ring.

Fig. 3 is a transverse section through a base in which the second step in forming the packing ring is performed, the spinning head being shown in elevation.

Fig. 4 is a central vertical section through a die in which the last step of the method may be performed.

Fig. 5 is a transverse section through a finished gasket.

Fig. 6 shows one of various forms of gaskets which may be produced by my improved method.

Figs. 6a, 6b, 6c, and 6d are cross sectional views showing different modifications of packing strips.

Fig. 7 shows a perspective view illustrating one of various folds which may be used in forming the completed ring.

Fig. 7a is a different embodiment of such a ring.

Fig. 7b is a third form of this type of ring.

Fig. 8 is a plan view partly in perspective showing a circular ring; and

Fig. 9 is a similar view showing an oval ring formed according to my invention.

In carrying out my invention I employ a section of tubular material preferably of fabric which, as shown at 6, in Fig. 2, may be woven at right angles to the length of the tube, or, as shown at 7, may be woven on a bias relative to the longitudinal axis of the tube. While I prefer to form the ring of a continuous woven tube it is possible to form the same of several layers which may be secured together by sewing along a seam 8.

In Fig. 2a, I have shown how the tube may be made of a winding of fabric into tubular form, the windings being two or more complete turns, the ends being opposite and preferably along a bias line, as at 8 in Fig. 2. The contacting layers may be cemented together, if desired.

The tube is thus formed of a strip, the margins of which are indicated at 10 and 11, the edges of which will not form lumps in the tube as is commonly done.

The material which is used may be a cotton fabric, either straight weave, or on the bias, although in many circumstances asbestos is desirable or even preferable, especially where the fluid to be packed off is at a high temperature.

In Figs. 2b, 2c, 2d, and 2e, I have illustrated how a tube of either wrapped or continuously woven material may be folded. At 2c, I have shown the tubular member with one end folded back on the body of the tubing to form a fold 13. If a double layer of material is sufficient the folded portion may be severed from the body of the tubular member along the edge of the fold 13, thus producing a hoopshaped ring. However, if more than two layers of the material are desired, the other end of the tube may be also folded outwardly to lie against the outer surface of the fold 13, thus producing a ring with three layers, as shown in Fig. 2d, where the outer fold 15 lies against the outer surface of the fold 13.

In Fig. 2e, I have shown how a ring of four thicknesses may be formed and in this instance the two ends of the tubular section of fabric are folded over so that the ends of the folds 13 will contact with each other. The member is then folded again at a point midway of its length so as to bring the two folds 13 against each other, as shown at 16. These rings are shown as being formed of one layer of woven material, but obviously my wrapped tube b may be thus folded. When the material is the straight weave shown at 6, the tubes cannot easily be formed into gasket form shown in Fig. 5. I will now describe how the rings are next treated.

These rings when in their first stage lie in a plane longitudinally relative to their axes. I next change the shape of these rings so that they will lie in a plane at right angles to the axis. This is done by placing the ring in a base 18 having a tapered seat 17. The ring will then be in the position shown at 20 in Fig. 3. A conical head 19, tapered to fit within the seat 17, is then lowered down against the packing member and rotated, thus acting to spin the ring in the seat 17. The spinning head is gradually forced against the ring and it is compressed and ironed out into a frusto-conical shape indicated in dotted lines at 21.

The frusto-conical shaped ring is then placed in a die having a base 23 with an upwardly extending central boss 24. A die ring 22 adapted to engage over the boss or post 24 is then forced downwardly against the ring 20 and great pressure is exerted upon the die to deform the ring into a flattened shape parallel with the adjacent surfaces of the die. When thus finished the ring will assume the form shown in Fig. 5.

It is to be noted that when the tubular member is folded outwardly, as shown in 2b, 2c, 2d, and 2e, the outwardly folded portion is stretched slightly and the inner portion is slightly compressed by the tension of the outer fold. There is, at the edge of the fold, thickened at 14, a condensed portion which, when the ring has been completed, lies at the edge of the ring. Thus, in Fig. 5, the inner edge 14 is compressed at the fold and the outer edge 14 is also slightly compressed. Thus there is a slightly denser portion of the ring lying adjacent the margins thereof which enables the ring to more efficiently protect against leakage. The ring is densest, however, adjacent the inner edge due to the deformation of the ring in the second and third steps in the formation of the ring.

While I have shown the ring as lying in a plane radial to the axis of the ring it may assume other forms. Thus in Fig. 6 is the usual form with the single fold. In Fig. 6a, there is a double fold with the ring formed on a plane which sets at an angle relative to the radius. In Fig. 6b, the ring is arcuate in cross section and this form is called a cupped ring. In Fig. 6c, the ring is frusto-conical but formed on a double taper. The ring in Fig. 6d is a compound folded ring and illustrates the manner in which the ring will be folded and it is to be noted that the folds are so arranged as to trap the pressure fluid within the folds as far as possible.

The rings which are thus produced may be circular in form, as shown in Fig. 8, or may be of oval shape or any other desired shape capable of production by the method which I have described. When the ring has been completed into the forms disclosed best in Figs. 7 to 7b, inclusive, they may be employed in packing off around pipe joints or around manholes, as shown particularly in Fig. 1, or, in general, around areas subjected to fluid under pressure where leakage is to be prevented. In Fig. 1 the ring 5 is shown as being placed in an annular recess about the manhole A, formed in the boiler plate 1. The cover plate 2 has a downwardly presented rim adapted to engage against the ring 5, said plate being compressed against the ring by means of the T bolt 3 engaging on its inner end against the interior of the boiler and having its outer end clamped against the plate 2 by the nut 4. This is simply one illustration of the manner in which the ring may be used, but I desire it to be understood that it is to be employed particularly wherever high pressures are to be sealed off.

The advantage of my device lies in the fact that it is of uniform thickness throughout and that by my method of manufacturing such gaskets they will be made of any desired thickness by simply increasing the number of folds.

The method which I have described in forming my completed gasket is adapted for use particularly with straight woven material which it may be understood is difficult to fold. I have found it impossible to form the folded ring shown in Figs. 2c, 2d, and 2e into the form shown in Fig. 5 flattended in the plane radial to the axis of the gasket, by any operation omitting the spinning step disclosed in Fig. 3. However, when the material of which the original tube is constructed is woven on the bias, as shown at 7, the step disclosed in Fig. 3 may, with some materials at least, be eliminated and the folded tube may be distorted in the Fig. 5 form by the single step disclosed in Fig. 4.

The preferred form of gasket is made up of two or more windings of material such as is disclosed in Fig. 2a. The completed ring of this type is shown in Fig. 7 on the two outer views there disclosed. A gasket thus formed is free of lumps or irregular thicknesses and will form a uniform layer of folded material allowing the parts of the joint that are to be sealed to lie smooth and even without adjustment.

When the finished gasket is to be employed around materials subjected to high temperature, the fabric material is preferably impregnated with non-vulcanized rubber which allows them to be fitted in place much more readily, but when they are subjected to heat they vulcanize into the shape which is desired. To prevent the adherence of the rubberized fabric to the metal when the ring is vulcanized, I paint over the outer surface thereof a film of varnish or oil, which tends to form a thin layer between the gasket and the metal, such as is shown at 15 in Fig. 1.

This layer has the effect of hardening quickly and preventing vulcanizing of the rubber to the metal. Thus, when the gasket is to be removed it can be broken loose from its seat readily without having to chip the gasket from its usual vulcanized attachment on the metal. This feature of painting the unvulcanized fabric ring or gasket is a feature of some importance in connection with my invention.

What I claim as new is:

1. A method of forming a packing gasket comprising forming a continuous tube of fabric material of the desired length, folding a predetermined length of said tube back over the adjacent section to form a hoop-shaped member, placing said member in a tapered seat, spinning said member in said tapered seat, then submitting said ring to pressure between two parallel planic surfaces until it is flattened in a plane at right angles to the axis of the ring.

2. A method of forming a packing member including forming a tube of porous flexible material, folding a portion of said tube outwardly to form a cuff, folding the other end outwardly relatively to the body of said tube to produce a cylindrical hoop-shaped ring, spinning said ring between adjacent tapered surfaces, and then flattening said ring into a transverse plane at right angles to the axis of said ring.

3. A method of forming a packing member including forming a tube of porous flexible material, covering the outer surface with an adhesive substance, folding a portion of said tube outwardly to form a cuff, folding the other end outwardly relatively to the body of said tube to produce a cylindrical hoop-shaped ring, spinning said ring between adjacent tapered surfaces, and then flattening said ring into a transverse plane at right angles to the axis of said ring.

4. A method of forming gaskets including folding a tubular section of absorbent material outwardly to produce the desired number of layers contacting with each other and of cylindrical shape, forming the folded tube into a frusto-conical shape and then flattening the same into a plane perpendicular to and transversely of the axis of said ring by exerting high pressure thereon.

5. A method of forming packing gaskets, comprising winding a blank of straight woven rubberized fabric material into tubular form with the ends cut along a line so as to lie opposite each other to avoid overlapping, folding said tube transversely to form overlying folds, spinning said ring into frusto-conical form, next compressing said frusto-conical ring into a flat gasket, and covering the surface thereof with a material drying at high temperatures to form a thin coating thereon.

6. A method of forming a packing gasket comprising forming a continuous tube of fabric material of the desired length, folding a predetermined length of said tube back over the adjacent section to form a cylindrical hoop, acting upon said hoop to distort the same into frusto-conical shape, and submitting the gasket to pressure between planar surfaces to flatten the same into folds lying in a plane at right angles to the axis thereof.

7. A method of forming packing gaskets comprising impregnating a tube of fabric material with unvulcanized rubber, folding said tube into a plurality of cylindrical layers, distorting said layers into frusto-conical shape, compressing the same into a plane at right angles to the axis of said tube, and coating the surface of the same with a varnish to prevent adherence of said gasket to heated metal in use.

HARLEY T. WHEELER.